US011714997B2

(12) United States Patent
Saleh et al.

(10) Patent No.: US 11,714,997 B2
(45) Date of Patent: Aug. 1, 2023

(54) ANALYZING SEQUENCES OF INTERACTIONS USING A NEURAL NETWORK WITH ATTENTION MECHANISM

(71) Applicant: PayPal, Inc., San Jose, CA (US)

(72) Inventors: Moein Saleh, Campbell, CA (US); Chiara Poletti, San Jose, CA (US); Shiying He, Santa Clara, CA (US); Hagar Oppenheim, Santa Clara, CA (US); Xing Ji, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 126 days.

(21) Appl. No.: 17/204,578

(22) Filed: Mar. 17, 2021

(65) Prior Publication Data
US 2022/0300785 A1  Sep. 22, 2022

(51) Int. Cl.
| | |
|---|---|
| *H04L 67/306* | (2022.01) |
| *G06N 3/049* | (2023.01) |
| *G06F 17/18* | (2006.01) |
| *G06Q 20/40* | (2012.01) |

(52) U.S. Cl.
CPC ............. *G06N 3/049* (2013.01); *G06F 17/18* (2013.01); *G06Q 20/4016* (2013.01); *H04L 67/306* (2013.01)

(58) Field of Classification Search
CPC ..... H04L 67/306; H04L 51/234; G06N 3/049; G06N 3/04; G06F 17/18; G06Q 20/4016
See application file for complete search history.

(56) References Cited

U.S. PATENT DOCUMENTS

| | | | |
|---|---|---|---|
| 9,508,340 B2 | 11/2016 | Parada San Martin et al. | |
| 9,792,534 B2 | 10/2017 | Wang et al. | |
| 9,811,765 B2 | 11/2017 | Wang et al. | |
| 10,453,099 B2 | 10/2019 | Korpusik et al. | |

(Continued)

OTHER PUBLICATIONS

Dzmitry Bahdanau, et al., Neural Machine Translation by Jointly Learning to Align and Translate, International Conference on Learning Representations Conference Paper 2015, pp. 1-15.

(Continued)

*Primary Examiner* — Jungwon Chang
(74) *Attorney, Agent, or Firm* — Kowert, Hood, Munyon, Rankin & Goetzel, P.C.; Dean M. Munyon

(57) ABSTRACT

Users interact with a computer system, which collects data about individual interactions the users have had with the computer system. The users are sorted into one of a first group or a second group. The computer system generates respective user sequence models for the users using information representing the individual interactions. The computer system analyzes the respective user sequence models using a recurrent neural network with an attention mechanism, which produces respective vectors corresponding to the user sequence models. Individual values in the vectors represent respective individual interactions by a given user and correspond to an amount of correlation between the respective individual interactions and the sorting of the given user into the first group or the second group. The computer system identifies a particular type of interaction that is correlated to users being sorted into the first group by analyzing the respective vectors.

20 Claims, 7 Drawing Sheets

(56) References Cited

U.S. PATENT DOCUMENTS

| | | | | |
|---|---|---|---|---|
| 11,095,601 B1* | 8/2021 | Wilson | ................ | H04L 51/234 |
| 2017/0322788 A1* | 11/2017 | Baxter | ..................... | G06F 8/60 |
| 2018/0183852 A1* | 6/2018 | Jackson | ............... | G06Q 50/01 |
| 2019/0325528 A1* | 10/2019 | Adjaoute | ............... | G06N 20/00 |
| 2020/0065709 A1 | 1/2020 | Flinn et al. | | |
| 2020/0104697 A1* | 4/2020 | Bhatia | ..................... | G06N 3/04 |
| 2020/0336503 A1* | 10/2020 | Xu | ..................... | H04L 63/1425 |
| 2020/0364588 A1* | 11/2020 | Knox | ................ | G06K 9/6268 |
| 2021/0012211 A1* | 1/2021 | Sikka | ................ | G06N 3/0481 |

OTHER PUBLICATIONS

Attention Mechanism, FloydHub Blog, https://blog.floydhub.com/attention-mechanism/, Sep. 15, 2019, 29 pages.

* cited by examiner

FIG. 4

Table 400:

| | 1 | | 2 | | 3 | | 4 | | 5 | | 6 | | 7 | | 8 | | 9 | | 10 | | 11 | | 12 | | 13 | | 14 | | 15 | |
|---|---|---|---|---|---|---|---|---|---|---|---|---|---|---|---|---|---|---|---|---|---|---|---|---|---|---|---|---|---|---|
| User A | ET1 | 0.07 | ET2 | 0.18 | ET3 | 0.01 | ET4 | 0.01 | ET4 | 0.04 | ET6 | 0.13 | ET1 | 0.09 | ET1 | 0.10 | ET1 | 0.11 | ET3 | 0.01 | ET3 | 0.03 | ET1 | 0.09 | ET5 | 0.03 | ET1 | 0.09 | ET1 | 0.01 |
| User B | ET1 | 0.10 | ET1 | 0.07 | ET1 | 0.08 | ET5 | 0.09 | ET1 | 0.02 | ET1 | 0.02 | ET2 | 0.01 | ET3 | 0.01 | ET1 | 0.08 | ET3 | 0.10 | ET1 | 0.08 | ET1 | 0.10 | ET4 | 0.05 | ET3 | 0.07 | ET1 | 0.12 |
| User C | ET2 | 0.07 | ET1 | 0.21 | ET1 | 0.05 | ET2 | 0.04 | ET2 | 0.07 | ET3 | 0.01 | ET5 | 0.08 | ET3 | 0.02 | ET1 | 0.01 | ET4 | 0.09 | ET3 | 0.10 | ET1 | 0.01 | ET1 | 0.08 | ET3 | 0.01 | ET3 | 0.15 |
| User D | ET3 | 0.06 | ET1 | 0.11 | ET1 | 0.03 | ET1 | 0.07 | ET6 | 0.01 | ET2 | 0.07 | ET1 | 0.05 | ET1 | 0.05 | ET5 | 0.11 | ET4 | 0.06 | ET4 | 0.04 | ET3 | 0.09 | ET3 | 0.07 | ET1 | 0.09 | ET1 | 0.09 |

Table 450:

| | ET1 | ET2 | ET3 | ET4 | ET5 | ET6 |
|---|---|---|---|---|---|---|
| Mean B / Mean A | 0.92 | 0.66 | 1.66 | 1.90 | 1.33 | 0.08 |
| Mean A / Mean B | 1.08 | 1.52 | 0.60 | 0.53 | 0.63 | 13.00 |

ANALYZING SEQUENCES OF INTERACTIONS USING A NEURAL NETWORK WITH ATTENTION MECHANISM

BACKGROUND

Technical Field

This disclosure relates generally to analyzing data collected about user interactions with a computer system.

Description of the Related Art

When users interact with a computer system, vast amounts of data can be collected about the frequency and type of user interactions with the computer system. For example, a user may log in to their user account, access one or more websites, and then log out of their user account. For each of these interactions, the computer system may collect detailed data (e.g., when the interaction occurred, from where, what was the result of the interaction, etc.). Such data may be analyzed to predict user behavior and to identify avenues to influence usage patterns of users to the benefit of the computer system. Information about user interactions may be stored in data stores for analysis, and the results of such analysis may be used, for example, to improve the security of the computer system or improve performance.

Recurrent neural networks with attention mechanisms have been used to analyze sequences of inputs. For example, recurrent neural networks with an attention mechanism have been used to perform machine translation of text.

BRIEF DESCRIPTION OF THE DRAWINGS

FIG. 4 is an example table illustrating the vectors generated by the neural network shown in FIG. 2 and a summary table illustrating analysis performed on such vectors using the vector analysis module of FIG. 2 in accordance with various embodiments.

Figure 1:
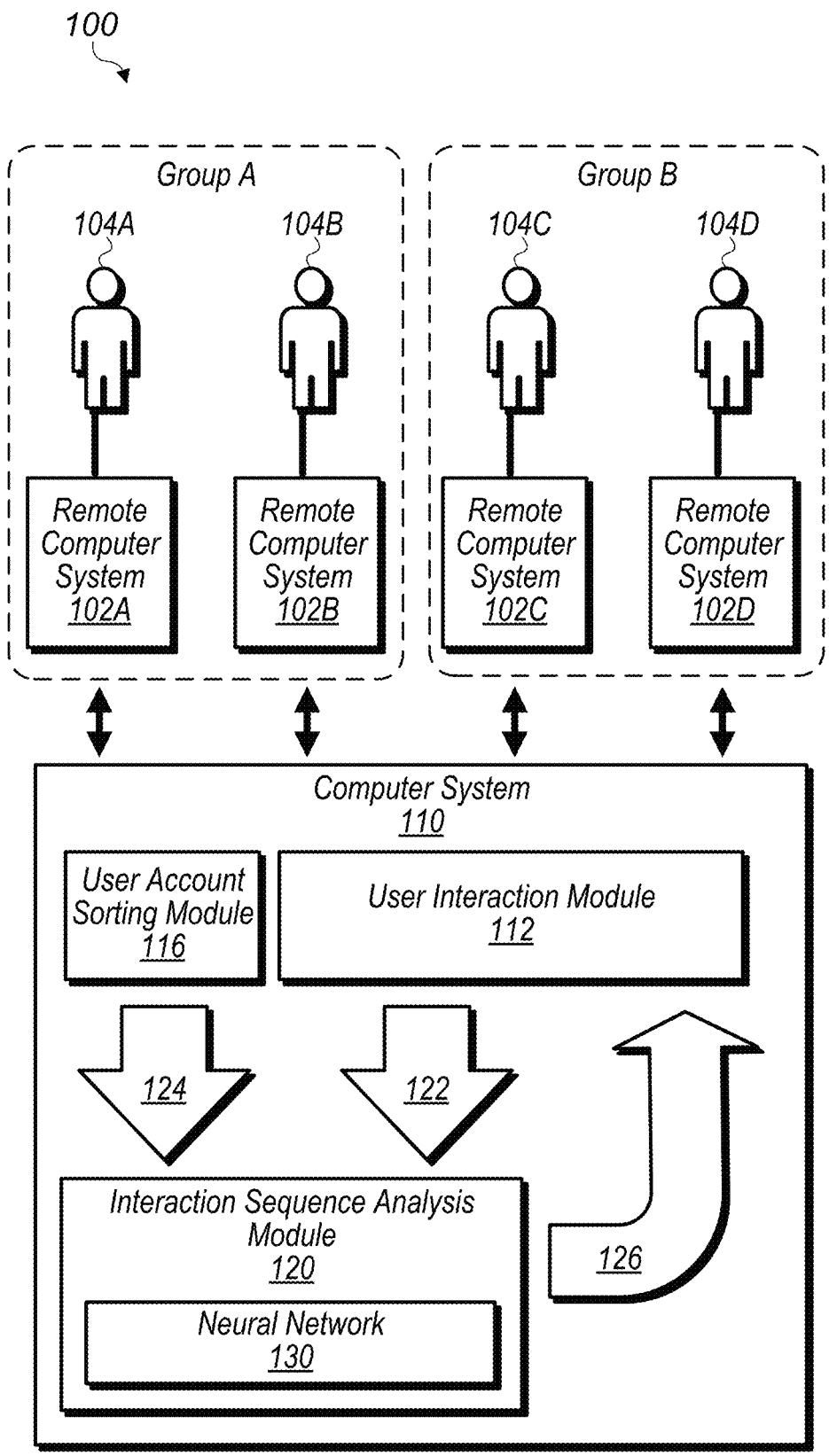
FIG. 1 is a block diagram illustrating an embodiment of a computer system configured to record and analyze interaction information with a plurality of remote computer systems in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to analyze" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" groups would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

Data about user interactions with a computer system can reveal important and valuable insights into the operation of the computer system. These interactions can be as diverse as an app download, a login event, online browsing, a store visit, shopping, etc. and may be stored in a variety of ways such as click-stream and events logging. Data about these interactions, however, may be in any of a number of different formats and stored in any of a number of ways. Storing and analyzing this data in a temporal and longitudinal fashion can be challenging such that operators of computer systems are not able to comprehensively analyze the data and maximize its value. By using machine learning techniques, however, such data may be analyzed more effectively. Disclosed herein are techniques to apply a modified attention mechanism in a recurrent neural network (e.g., a long short-term memory or "LSTM") deep learning model in order to identify patterns in user usage and derive actionable decisions. In the disclosed methodology, recurrent neural network models having an "attention mechanism" property are used in order to study the frequencies, types, and interaction between the events in order to analyze and study the importance, significance, and impact of each event on the grouping of a user (e.g., grouping of a user with other users who have been associated with security breaches).

From the analysis produced by the neural network, particular types of interactions with users can be identified that are correlated with the grouping of the users, and the user interface used to interface with users can be adjusted accordingly. For example, data may be collected and analyzed to determine which types of user interactions are most associated with security breaches or unauthorized usage, and based on this determination operational parameters of the computer system may be adjusted to prevent or ameliorate security breaches. The user interface of the computer system may be adjusted to require additional authentication before granting a request that is of the type that has been identified as being associated with security breaches.

Referring now to FIG. 1, a block diagram is shown illustrating a network 100 operable to facilitate communication between a plurality of users 104 and a computer system 110. Network 100 includes a computer system 110 that is operable to communicate with a plurality of remote computer systems 102 used by respective users 104 to interact with computer system 110. In the embodiment shown in FIG. 1, four remote computer systems 102A, 102B, 102C, and 102D are shown and are used by respective users 104A, 104B, 104C, and 104D to interact with computer system 110, although it will be understood that any number of remote computer systems 102 and users 104 may be interacting with computer system 110. Further, computer system 110 may be implemented on a distributed cloud of computer systems as discussed below and is not limited to only a single computer system. For example, a computer system 110 that is implemented on hundreds of servers may be in communication with millions of remote computer systems 102. Additionally, in some embodiments, remote computer systems 102 interact with a particular aspect of computer system 110 (e.g., a web server implemented by computer system 110) and the analysis discussed herein may be performed by a separate aspect of computer system 110 with which remote computer systems 102 do not directly interact (e.g., an internally-facing server implementing a data analytics service). In various embodiments, the various components of network 100 communicate over any of a number of wired and/or wireless transmission mediums. In various embodiments, the components of network 100 communicate over the Internet.

The remote computer systems 102 are computer systems that are operable to facilitate interactions between users 104 and computer system 110. In various embodiments, individual remote computer systems 102 are implemented by software running on a computer system (e.g., a desktop computer, a laptop computer, a tablet computer, a mobile phone, a server) or a plurality of computer systems (e.g., a network of servers operating as a cloud). In other embodiments, individual remote computer systems 102 are implemented in specialized hardware (e.g., on an FPGA) or in a combination of hardware and software. In various instances, individual users 104 are able to use individual remote computer systems 102 to interact with computer system 110. As an example, four remote computer systems 102 including remote computer systems 102A, 102B, 102C, and 102D and four users 104 including users 104A, 104B, 104C, and 104D are illustrated in FIG. 1, but any number of remote computer systems 102 may facilitate interactions between any number of users 104 and computer system 110 in various embodiments. As used herein, unless otherwise specifically indicated, references to "a particular remote computer system 102" or "a given remote computer system 102" refer to any one of the remote computer systems 102 in network 100. Similarly, as used herein, unless otherwise specifically indicated, references to "a particular user 104" or "a given user 104" refer to any one of the users 104 using a remote computer system 102 in network 100. In various instances, individual interactions with computer system 110 (also referred to herein as interaction events) include but are not limited to logging in to a user account, logging out of a user account, downloading one or more files, installing an app, accessing a website, etc. Additional types of interactions are discussed in reference to FIG. 4.

In various embodiments, user 104 (e.g., user 104A) has a user account with a service provided by computer system 110 (e.g., a website operated using computer system 110) and using a remote computer system 102 (e.g., remote computer system 102A) to interact with computer system 110 includes using such a user account. Such uses of a user account made be facilitated by, for example, tracking software such as a cookie installed on the particular remote computer system 102 that associates the particular remote computer system 102 with the user account. In other embodiments, user 104 does not user a user account but is identified by other identifiers such as patterns of usage (e.g., time and originating IP address), identifiers of remote computer system 102 used to perform the interaction (e.g., using a fingerprinting algorithm), or a combination. In some embodiments, user profiles may be generated based on such patterns or usage and/or identifiers of remote computer system 102 and interactions with a user may be tracked via a user profile, even if the user has not registered an account with computer system 110. In some embodiments, user 104 (e.g., user 104A) uses a user account and is further identified using patterns or usage and/or identifiers of remote computer system 102 (e.g., remote computer system 102A) used to perform the interactions. Thus, as recited herein an "interaction with a user" includes interactions with a user 104 (e.g., user 104A) who is identified via a user account and interactions with a user 104 (e.g., user 104A) who is not identified via a user account but through other techniques such as tracking patterns or usage and/or identifiers of remote computer system 102 (e.g., remote computer system 102A).

Computer system 110 is a computer system that is operable to interact with remote computer systems 102 and to analyze such interactions as discussed herein. In various embodiments, computer system 110 is implemented by software running on a computer system (e.g., a desktop computer, a laptop computer, a tablet computer, a mobile phone, a server) or a plurality of computer systems (e.g., a network of servers operating as a cloud). In other embodiments, computer system 110 is implemented in specialized hardware (e.g., on an FPGA) or in a combination of hardware and software. In various embodiments, server computer system 110 is operable to perform other functions in addition to interaction with remote computer systems 102 and analyzing such interactions (e.g., performing transactions with other computer systems, storing secure resources and controlling access to such secure resources, etc.). In various embodiments, computer system 110 includes user interaction module 112, a user account sorting module 116, and an interaction sequence analysis module 120. Computer system 110 and its components are discussed in further detail herein in reference to FIGS. 2, 3, and 4.

In various embodiments, user interaction module 112 is operable to facilitate interactions with remote computer systems 102 and users 104 by facilitating communication between computer system 110 and remote computer systems 102. In various embodiments, user interaction module 112 facilitates interactions by providing a user interface (e.g., user interface 202 shown in FIG. 2). In various embodiments, user interaction module 112 is operable to store information about interactions with users 104 (e.g., in one or more data stores of interaction information 200 shown in FIG. 2). In various embodiments, user interaction module 112 uses a plurality of data stores to store information about interactions with users 104. Extracted user interaction information 122 is sent from user interaction module 112 to interaction sequence analysis module 120. In various embodiments, user interaction module 112 is operable to send all recorded information about interactions with users 104 to interaction sequence analysis module 120. In other embodiments, interaction sequence analysis module 120 is operable to identify a subset of the recorded information about interactions with users 104 and extract such a subset as extracted user interaction information 122. In various embodiments, neural network 130 determines the information to extract as extracted user interaction information 122 as discussed herein. User interaction module 112 is discussed in further detail herein in reference to FIG. 2, and extracted user interaction information 122 is discussed in further detail herein in reference to FIGS. 2 and 3.

In various embodiments, user account sorting module 116 is operable to determine whether a given user 104 should be sorted into one of two groups: Group A or Group B. Thus, in various embodiments, user account sorting module 116 is operable to sort at least a first plurality of users 104 (e.g., users 104A and 104B) into Group A and a second plurality of users 104 (e.g., users 104C and 104D) into Group B, as shown in the embodiment illustrated in FIG. 1. It will be understood, though, that FIG. 1 is merely a simplified example. In various instances, there may be tens of millions of users 104 with millions of users 104 sorted into Group A and millions of other users 104 sorted into Group B. In various instances, not all of users 104 are sorted into Group A or Group B. For example, some users 104 may not be sorted into either Group A or Group B and be excluded from the analysis discussed herein. In other embodiments, some users 104 may be sorted into another group (e.g., a Group C or Group D), but again such users 104 would be excluded from the analysis discussed herein.

Thus, regarding a plurality of users 104, recitations of "wherein individual users of the plurality of users have been sorted into one of a first group or a second group" and "wherein individual users of the plurality of users belong to one of a first group or a second group" are not limited to embodiments in which all of a plurality of users are sorted into or belong to either the first group or the second group (e.g., some users 104 may be not sorted into any group and/or some users may be sorted into other groups). User account sorting module 116 may use any of a number of suitable criteria to sort users 104 into Group A and Group B. As discussed herein, for example, in some embodiments Group A includes users 104 who have reported fraudulent or unauthorized account access and Group B includes users 104 who have made no such reports. In another non-limiting example, Group A includes a first set of users 104 who have been determined to be highly valuable to computer system 110 (e.g., a first set of users 104 who have spent more than a threshold amount of time or money using computer system 110) and Group B includes a second set of users 104 who have been determined to be less value able to computer system 110 (e.g., a second set of users 104 who have spent less than a threshold amount of time or money using computer system 110). User account sorting module 116 is operable to output one or more sorting indications 124 to interaction sequence analysis module 120 which indicates which users 104 (e.g., users 104A and 104B) have been sorted into Group A and which users 104 (e.g., users 104C and 104D) have been sorted into Group B. User account sorting module 116 and sorting indications 124 are discussed in further detail in reference to FIG. 2.

In various embodiments, interaction sequence analysis module 120 is operable to receive extracted user interaction information 122 from user interaction module 112 and receive sorting indications 124 from user account sorting module 116, and use the extracted user interaction information 122 and sorting indications 124 to determine correlations between interactions with users 104 and whether the users 104 are grouped into Group A or Group B. In various embodiments, interaction sequence analysis module 120 is operable to output analysis results 126. In various embodiments, analysis results 126 are output to user interaction module 112 to automatically adjust user interaction module 112 (e.g., by adjusting user interaction parameters 204 discussed in connection to FIG. 2). Additionally or alternatively, analysis results 126 may be presented to analysts in a report (e.g., a report indicating potential security weaknesses for additional investigation). Analysis results 126 are discussed in further detail in reference to FIGS. 2, 3, and 4.

In various embodiments, interaction sequence analysis module 120 is operable to generate respective user sequence models for a plurality of users 104 using extracted user interaction information 122. The user sequence models include entries that represent individual interactions with respective users 104. In various embodiments, user sequence models include information about individual interactions with individual users 104 arranged in chronological sequence. In various embodiments, user sequence models may be arranged individual interactions in chronological with the events occurring earlier in time appearing toward the beginning of the sequence. For example, if user 104A's interaction sequence includes at an application download event at time=0, an account login event at time=1, and an account logout event at time=2, the user sequence model will include information representing all three events at all three times in that order. In other embodiments, however, the user sequence models may be in reverse chronological order with events happening later in timer appearing toward the beginning of the sequence.

In various embodiments, interaction sequence analysis module 120 is operable to use a neural network 130 to generate the user sequence models for a plurality of users 104 using the extracted user interaction information 122 representing individual interactions with the plurality of users 104. In some of such embodiments, one or more layers of neural network 130 determine which information stored about interactions with users 104 to extract (e.g., from one or more data stores of interaction information 200 shown in FIG. 2) as extracted user interaction information 122. In various embodiments, neural network 130 is a recurrent neural network with an attention mechanism that takes as input the extracted user interaction information 122 and sorting indications 124. As discussed in further detail in reference to FIGS. 2 and 3, the attention mechanism is implemented as one or more layers in neural network 130 that facilitates identification of which events in the user sequence models are most correlated with the grouping of a given user 104 into Group A or Group B (e.g., which events are most correlated with grouping users 104A and 104B into Group A). Using the attention mechanism, neural network 130 is operable to generate respective vectors (e.g., vectors 212 shown in FIG. 2) corresponding to the respective user sequence models. As discussed in further detail herein, in various embodiments, the vectors generated by neural network 130 for a sequence of interactions for a given user 104 (e.g., user 104A) include values (also referred to herein as "attention weights") that correspond to an amount of correlation between the respective individual interactions and the sorting of the given user 104 (e.g., user 104A) into their respective group (e.g., into Group A).

As discussed herein, by analyzing such vectors, interaction sequence analysis module 120 is operable to generate analysis results 126 in various embodiments. In various embodiments, any of a number of suitable statistical analysis techniques may be used to identify trends in the vectors. For example, interaction sequence analysis module 120 may be operable to generate analysis results 126 indicative of the type of interaction event most correlated with a set of users 104 being grouped into Group A (e.g., which events are most correlated with grouping users 104A and 104B into Group A) and the type of interaction event most correlated with users 104 being sorted into Group B (e.g., which events are most correlated with grouping users 104C and 104D into Group B). As discussed below, in some of such embodiments, such analysis may be based on, for example, calculating means, medians, mode, standard deviation or other statistical values for attention values assigned to interaction events of the same type and selecting a particular type of interaction event based on such statistical values. In some embodiments, the analysis may be based on analyzing consecutive attention weights in vectors to identify strings of interaction events that correlate to grouping into Group A or B (e.g., if vectors for numerous users 104 include the same string of three event types and the sum of the attention weights for these three event types is relatively high, then these event types in that order may be identified in analysis results 126). In other embodiments, interaction sequence analysis module 120 is operable to use a second machine learning algorithm (i.e., other than neural network 130) to analyze the vectors to generate analysis results. In various embodiments, analysis results 126 may be sent to user interaction module 112 and used to make adjustments to user interaction module 112. Additionally or alternatively, analysis results 126 may be sent elsewhere (e.g., included in a report that is sent to analysts). The user sequence models, neural network 130, vectors, and analysis results 126 are discussed in further detail in reference to FIGS. 2, 3, and 4.

Accordingly, the disclosed techniques allow for the analysis of records of user interactions with thousands or even millions of users using scalable deep learning techniques. Such analysis is usable to identify types of interactions which are associated with security breaches or authorized access and facilitate adjusting user interaction module 112 to prevent or ameliorate security breaches. For example, if the analysis discussed herein indicates that app download events are correlated with users 104 that have been grouped into a security breach group (e.g., Group A) and website login events are correlated with users 104 that have been grouped into a no security breach group (e.g., Group B), such a finding may be used to identify the app as a security vulnerability and to identify a way to increase security in the app (e.g., by adjusting the login process to required additional authentication). In another example, if the analysis discussed herein indicates that refunds within two days is correlated with users 104 that have been sorted into a highly valuable user group (e.g., Group A) and three consecutive login failures is correlated with users 104 that have been sorted into the less valuable user group (e.g., Group B), analysis results 126 may indicate that two-day refunds should be prioritized and that that consecutive login failures should be further investigated to determine, for example, whether the user interface module 112 is frustrating users 104 and driving down engagement.

Figure 2:
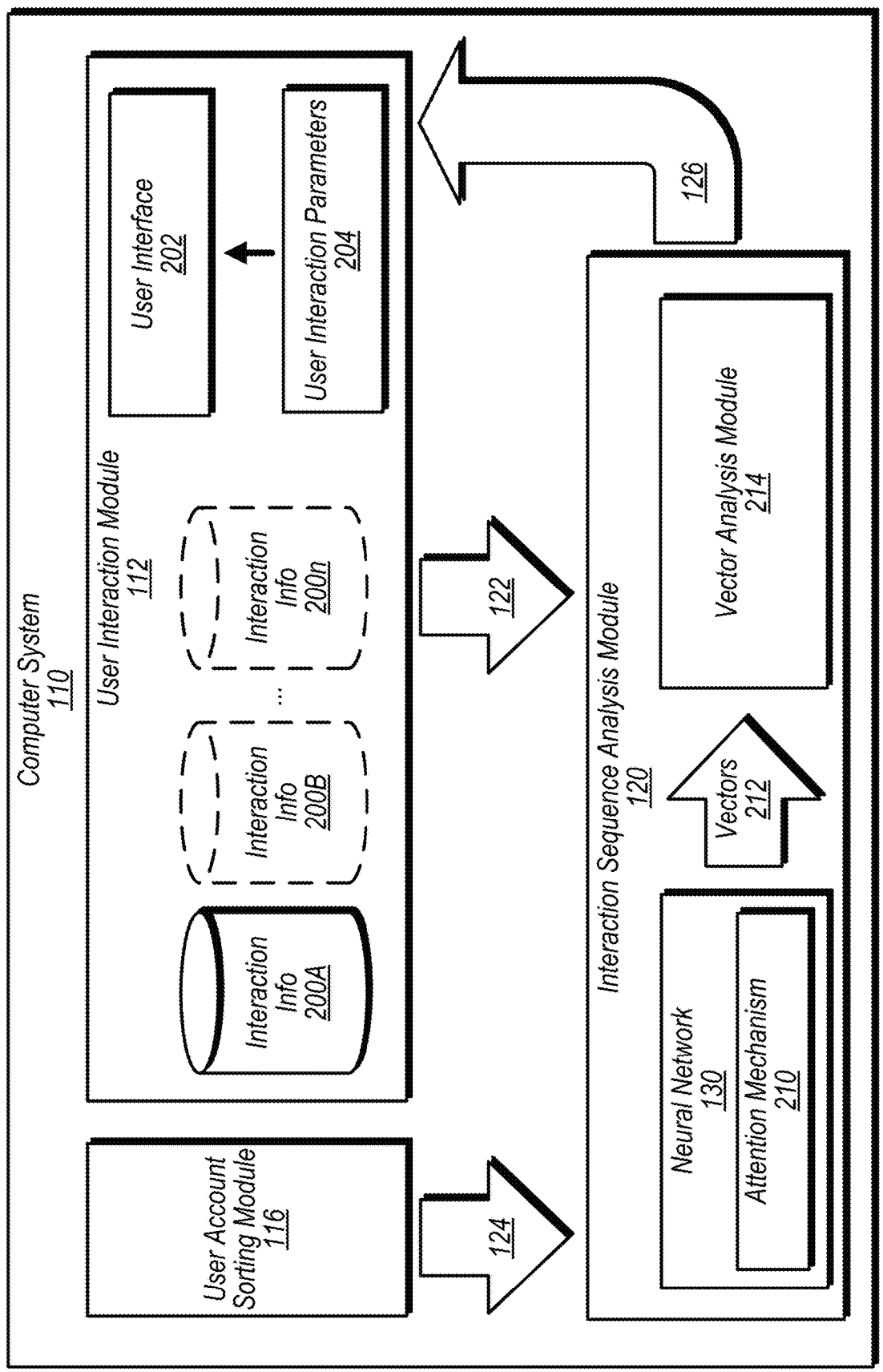
FIG. 2 is an expanded block diagram illustrating the computer system of FIG. 1 in accordance with various embodiments.

Referring now to FIG. 2, an expanded block diagram is shown illustrating computer system 110 in additional detail. As shown in FIG. 2, computer system 110 includes user interaction module 112, user account sorting module 116, and interaction sequence analysis module 120 previously discussed in reference to FIG. 1. While only one of each of these modules 112, 116, and 120 are shown in FIG. 1, it will be understood that more than one of each could be present (e.g., with a load balancing between additional instances of modules 112, 116, 120). In various embodiments computer system 110 is implemented on a cloud computing platform that distributes the various tasks associated with the operations performed by computer system 110 across a cloud of computer systems. Moreover, in various embodiments computer system 110 is operable to perform other tasks (e.g., facilitating transactions between users, securely storing media, facilitating administrator control of computer system 110) not represented in FIG. 2.

As discussed above, user interaction module 112 is operable to facilitate interactions with remote computer systems 102 and users 104 by facilitating communication between computer system 110 and remote computer systems 102. In various embodiments, user interaction module 112 is operable to store information about user interactions in one or more data stores of interaction information 200 (e.g., a first data store of interaction information 200A, a second data store of interaction information 200B, an nth data store of interaction information 200*n*). User interaction module 112 includes a user interface 202 that is operable to present information to and receive information from users 104 in various embodiments. In various embodiments, the operation of user interface 202 is adjustable based on user interaction parameters 204 that may be adjusted automatically based on analysis results 126 or by personnel after review of analysis results 126.

In various embodiments, data stores of interaction information 200 may be any suitable storage system (e.g., databases, tables, etc.). In various embodiments, different data stores of interaction information 200 may be usable to store different types of information corresponding to users 104. For example, a first data store of interaction information 200A may be operable to store login and logout information (e.g., login time, login result, IP address of a given remote computer system 102 logging in, logout time, etc.), a second data store of interaction information 200B may be operable to store browsing activity (e.g., track time spent on webpages presented using computer system 110, track the URLs accessed by a given remote computer system 102, etc.), and a nth data store of interaction information 200n may be operable to store information about customer service interactions (e.g., refunds, chats with customer service bots, chats with live personnel, etc.). In various embodiments, user sequence models are generated by accessing information from one or more data stores of interaction information 200 and extracting extracted user interaction information 122 from such data stores of interaction information 200. In various embodiments, interaction sequence analysis module 120 is operable to communicate with user interaction module 112 to extract the extracted user interaction information 122 that interaction sequence analysis module 120 is operable to use to generate user sequence models. In various embodiments, one or more layers of neural network 130 are operable to determine which information stored in data stores of interaction information 200 to extract.

In various embodiments, user interface 202 is operable to present information to and receive information from users 104 in any of a number of ways including visual, audio, and/or tactile interfaces. In various embodiments, computer system 110 sends information to remote computer system 102 (e.g., remote computer system 102A) to cause user interface 202 to be presented to user 104 (e.g., user 104A). For example, in various embodiments, user interface 202 includes a webpage served using computer system 110 and presented to user 104 by remote computer system 102 to present information to and receive information from user 104. In other embodiments, user interface 202 includes an app installed on remote computer system 102 that communicates with user computer system 110 to present information to and receive information from user 104. Thus, in various embodiments, user interface 202 is operable to facilitate interactions with users 104 as discussed herein.

In various embodiments, the operation of user interaction module 112 can be adjusted by changing user interaction parameters 204 based on analysis results 126 as discussed below. For example, user interaction parameters 204 may include security parameters that may be adjusted such that authentication procedures for users 104 may be made more stringent (e.g., to increase security) or less stringent (e.g., to increase authentication speed). As discussed herein, for example, in embodiments where Group A includes users 104 who have reported unauthorized access and Group B includes users 104 who have not reported unauthorized access, the techniques discussed herein may facilitate identifying one or more types of interactions correlated with users reporting unauthorized access (e.g., changing an address on a user account). In response, user interaction parameters 204 may be adjusted to require additional authentication (e.g., by requiring user 104 to enter a password, pass a CAPTCHA challenge, and/or enter a code for two-factor authentication) before allowing users 104 to complete the identified type of interaction. Similarly, in embodiments where Group A includes users who have been sorted into a highly valuable group and Group B includes users who have been sorted into the less valuable group, in response to identifying one or more types of interactions correlated with either or both groupings, user interaction parameters 204 may be adjusted to prioritize the resources available to computer system 110 to increase the types of interactions correlated with grouping into Group A. For example, if a user refund interaction event is determined to be correlated with grouping into Group A, resources (e.g., computational power, personnel workflows) may be prioritized to ensure user refunds are processed quickly. If, however, user refund interactions are not determined to be correlated with grouping into Group A but user logins and app download interaction events are determined to be correlated with Group A, resources may be adjusted to deprioritize user resources from user refunds and to prioritize user login and app download speeds.

As discussed above, user account sorting module 116 is operable to determine whether a given user 104 should be sorted into one of two groups: Group A or Group B using any of a number of criteria. In some embodiments, Group A may include users 104 (e.g., user 104A and 104B) who have reported unauthorized access and Group B may include users 104 (e.g., user 104C and 104D) who have not reported unauthorized access. In some embodiments, Group A may include users 104 who are more highly valuable to computer system 110 (e.g., because they spend more time or money using computer system 110) and Group B may include users 104 are less valuable to computer system 110 (e.g., because they spend less time or money using computer system 110). The disclosed techniques, however, are not limited to these two examples. Rather, user account sorting module 116 may be operable to sort user 104 into a Group A and a Group B according to any criteria (e.g., geographic location, user-reported satisfaction levels, operating system of remote computer system 102, web browser of remote computer system 102, etc.). User account sorting module 116 is operable to output sorting indications 124 to interaction sequence analysis module 120 using any of a number of suitable techniques including database entries and parameters in function calls.

Interaction sequence analysis module 120 is operable to receive extracted user interaction information 122 from user interaction module 112 and receive sorting indications 124 from user account sorting module 116, and use the extracted user interaction information 122 and sorting indications 124 to determine correlations between interactions with users 104 and whether the users 104 are grouped into Group A or Group B. In the embodiment shown in FIG. 2, interaction sequence analysis module 120 includes neural network 130, which is operable to generate vectors 212 using extracted user interaction information 122 and sorting indications 124. In various embodiments, vector analysis module 214 is operable to analyze vectors 212 to determine one or more types of interactions correlated with users 104 being sorted into Group A and Group B as discussed herein.

Interaction sequence analysis module 120 is operable to generate, using extracted user interaction information 122, respective user sequence models for the various users 104. In such embodiments, the respective user sequence models include representations of the individual interactions with a respective user 104. In various embodiments, the user sequence models include representations of the individual interactions in chronological or reverse chronological order. In such embodiments, the representations of the individual interactions include information indicating the type of interaction (e.g., a metadata tag that corresponds to a particular type of interaction) and order in the chronological (or reverse chronological) sequence (e.g., a time stamp). In various embodiments, each interaction with a given user 104 is represented in the user sequence model corresponding to that given user 104 (e.g., each interaction with user 104A is represented by a first user sequence model, each interaction with user 104B is represented with a second user sequence model), but in other embodiments only a subset of interactions is represented (e.g., the first 100 interactions, the most recent 100 interactions, although any number can be used as discussed below). In some embodiments, if a particular user 104 (e.g., user 104C) has not had over a threshold number of interactions with computer system 110 (e.g., 15 interactions, although any number can be used), that particular user 104 may be excluded from further analysis and a user sequence model not generated for that particular user. In various embodiments, the information used to represent the different individual interactions is determined using neural network 130. In such embodiments, the information extracted from the data stores of interaction information 200 as extracted user interaction information 122 is selected by neural network 130 after neural network 130 has been trained using known techniques.

In various embodiments, neural network 130 is operable to take as input extracted user interaction information 122 and sorting indications 124 and produce as output respective vectors 212 for individual users 104. In such embodiments, the respective vectors 212 include a series of values generated by neural network 130 that are indicative of the amount of correlation between individual interactions with respective users 104 and computer system 110. In various embodiments, neural network 130 is a recurrent neural network with an attention mechanism as discussed in further detail in reference to FIG. 3. In some of such embodiments, the respective vectors 212 include respective sequences of attention weights calculated using the attention mechanism of neural network 130 that represent respective individual interactions by the respective users. Such attention weights are indicative of the amount of correlation between a particular interaction with a particular user 104 and the grouping of that user (i.e., grouping into Group A or Group B). Such correlation is calculated by neural network 130 based on (a) the prior training of neural network 130, and (b) attention values calculated for other interactions with other users 104. Thus, the attention values for a particular interaction of a particular type with a particular user 104 is based in part on the amount of attention between interactions of the same particular type with other users 104. In some embodiments, the attention weight for various interactions is affected by the position within the user sequence model of the particular interaction (e.g., an interaction occurring earlier in the sequence has a greater attention weight than interaction later in the sequence, or conversely an interaction occurring later in the sequences has a greater attention weight than an interaction earlier in the sequence).

In various embodiments, vectors 212 are sequences of values (e.g., attention weights) representing individual interactions with individual users 104 as discussed herein. In some embodiments, the sum of the individual values of the given vector 212 equals the sums of the individual values of the other respective vectors. For example, in some embodiments, the individual values range between 0 and 1 and the total value of all of the values in a given vector adds up to 1. In various embodiments, a greater individual value in a vector 212 for a given user 104 is indicative of a greater amount of correspondence between the interaction represented by that individual value and the grouping of the given user 104 (e.g., into Group A or Group B). As discussed herein, in various embodiments, vectors 212 include an individual value for each interaction represented in each user sequence model generated and analyzed by neural network 130. Vectors 212 are discussed in additional detail with examples in reference to FIGS. 3 and 4.

In various embodiments, vector analysis module 214 is operable to take as input vectors 212 and analyze the vectors using any of a number of statistical techniques. In various embodiments, analyzing the respective vectors 212 includes, for example, comparing values (e.g., mean, median, mode, or other statistical values) calculated using respective sequences of attention weights for respective vectors of users 104 sorted in the first group (e.g., Group A), and values (e.g., mean, median, mode, or other statistical values) calculated using respective sequences of attention weights for respective vectors of users 104 sorted in the second group (e.g., Group B). For example, mean values may be calculated for each type of interaction represented in vectors 212 for users 104 grouped into Group A and for each type of interaction represented in vectors 212 for users 104 grouped into Group B.

In such an example, the type of interaction identified as being correlated most with membership in Group A may be the type of interaction with the greatest median value among Group A and the type of interaction identified as being correlated with membership in Group B may be the type of interaction with the greatest median value among Group B. In other examples, the mean value for each type of interaction represented in vectors 212 may be calculated. Then, the mean of individual values for vectors 212 corresponding to members of Group A (e.g., the mean of individual values calculated for all login interactions with users 104 in Group A) may be divided by the mean of individual values for vectors 212 corresponding to members of Group B (e.g., the mean of individual values calculated for all login interactions with users 104 in Group B). The type of interaction identified as being most correlated with membership in Group A may the type of interaction with the greatest (or lowest) quotient. For example, if the mean attention weight for app download events for members of Group A is 0.25 and the mean attention weight for app download events for members of Group B is 0.05, the ratio of the mean values of Group A and Group B is 5. If 5 is the greatest of any such ratio, the app download type of interaction may be identified as most correlated with membership in Group A. In various embodiments, the analysis performed by vector analysis module 214 includes correlating the position of individual values in vectors 212 with the position of the interaction represented by the individual values in the corresponding user sequence models. For example, individual values corresponding to types of interaction occurring more frequently towards the beginning of user sequence models (e.g., app download events) may be weighted more heavily than individual values corresponding to types of interactions occurring more frequently towards the end of user sequence models (e.g., user logout events), although the converse may be the case in other embodiments. The analysis conducted by vector analysis module 214 including an example is discussed in further detail in reference to FIG. 4.

In various embodiments, interaction sequence analysis module 120 is operable to output analysis results 126. In various embodiments, analysis results 126 are output to user interaction module 112 to automatically adjust user interaction module 112 by adjusting user interaction parameters 204. Additionally or alternatively, analysis results 126 may be presented to analysts in a report (e.g., a report indicating potential security weaknesses for additional investigation). In various embodiments, analysis results 126 include indications of a particular type of interaction that is correlated with users 104 being sorted into a first group (e.g., Group A) and/or a second type of interaction that is correlated with users 104 being sorted into the second group. As discussed above, the identification of the particular types of interactions is performed using the respective attention weights in vectors 212 discussed herein.

Figure 3:
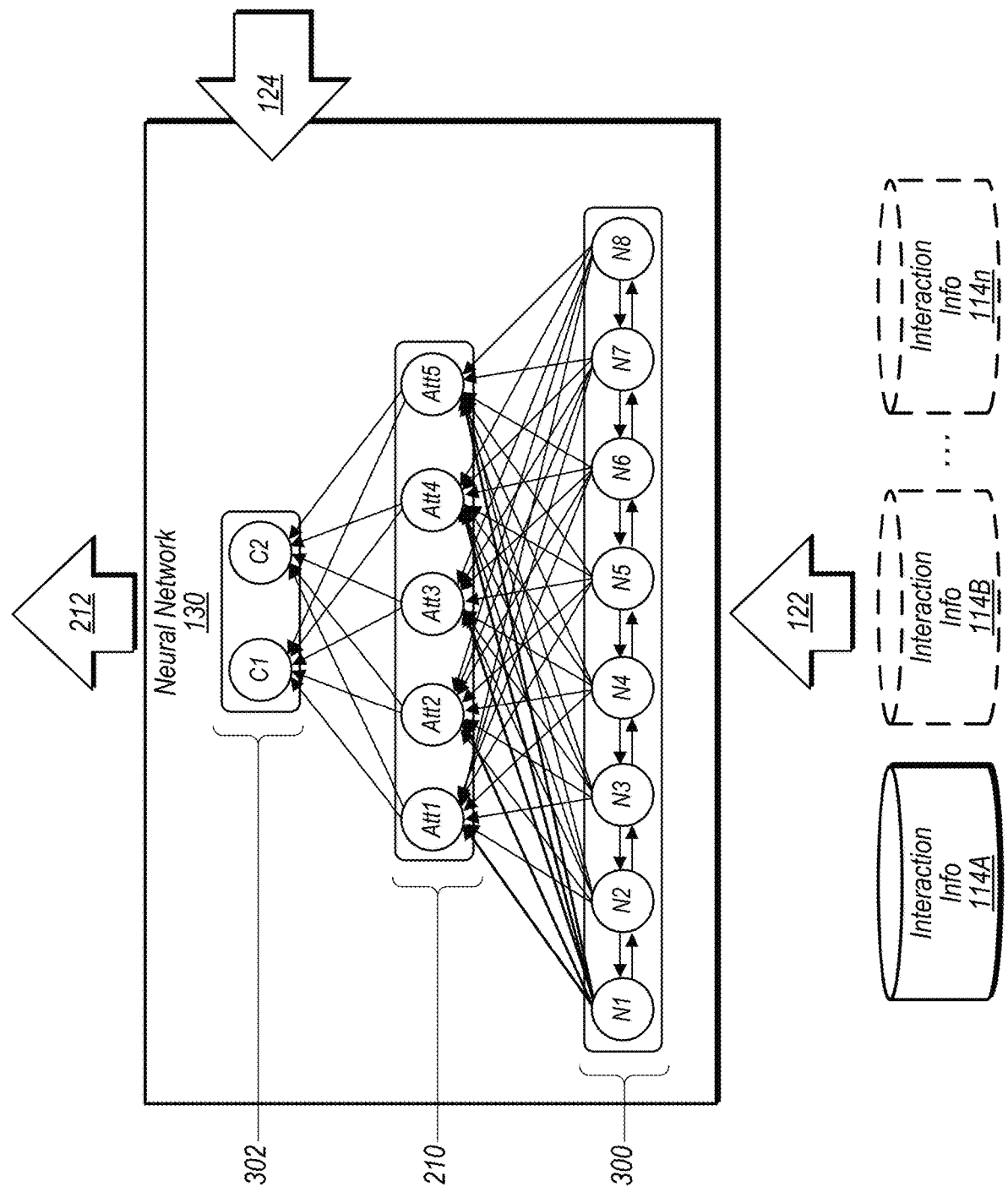
FIG. 3 is an expanded block diagram illustrating the neural network of FIG. 1 in accordance with various embodiments.

Referring now to FIG. 3, an illustration is shown of the architecture of neural network 130 and how neural network 130 receives extracted user interaction information 122 and sorting indications 124 to generate vectors 212. As shown in FIG. 3, neural network 130 includes three layers: an interaction information extraction layer 300, an attention mechanism layer 210, and a classification layer 302. In various embodiments, neural network 130 is a recurrent neural network that is implemented using a long short-term memory (i.e., interaction information extraction layer 300) and classification layer 302, and the attention mechanism is implemented using one or more attention layers (i.e., attention mechanism layer 210) added to the long short-term memory. In various embodiments, the long short-term memory is implemented using a many-to-one architecture such that each user sequence model has a corresponding label of whether the corresponding user 104 is grouped into Group A or Group B. This many-to-one architecture is implemented using a classification layer 302 with two nodes as shown in FIG. 3. As discussed herein, because each sequence of interaction events has a label (i.e., the sorting of the particular user 104 into Group A or Group B), neural network 130 is configured to determine the amount of correlation between the interaction events in the sequence and the label for the sequence. Thus, "many" interactions events are analyzed for their correlation to "one" label (i.e., Group A or Group B). Accordingly, as referred to herein, a "many-to-one architecture" for a neural network refers to a kind of neural network architecture trained to solve one or more problems (such as determining attention values as described herein) where the input to the neural network includes multiple values and the classification for the input has a single value.

This many-to-one architecture is different from the many-to-many architecture that may be employed in other applications. For example, prior work using recurrent neural networks with attention that is used to perform machine translation employs a many-to-many architecture to analyze text, which includes many words in one language, and to predict a translation for that text in a second language. Because the text in both languages includes many words, a many-to-many architecture is used. That is, the recurrent neural network in such a translation application is trained to receive as input an input sequence and return as output an output sequence. In contrast to such works, however, the disclosed techniques employ a different architecture (many-to-one) and perform a different application. Rather than determining which words in a sentence in a first language are correlated to words in a sentence in a second language (i.e., to facilitate machine translation), the disclosed techniques relate to determining the interactions a user 104 has had that correlate to the grouping of that user into one of two groups (i.e., Group A and Group B). Using the architecture shown in FIG. 3, interaction information extraction layer 300 is operable to determine which information to extract from data stores of interaction information 200 as extracted user interaction information 122 to generate user sequence models and pass such user sequence models to attention mechanism layer 210 and classification layer 302 to determine the attention values to assign to each interaction in the user sequence models, thereby generating vectors 212 according to various embodiments.

Interaction information extraction layer 300 is implemented using a number of nodes equal to the number of interaction events in each sequence of user interactions. In various embodiments, the number of nodes in interaction information extraction layer 300 is a hyperparameter of neural network 130 that is set prior to training neural network 130. In various embodiments, the number of interactions with the respective users 104 that are represented in user sequence models and the number of individual values in vectors 212 are likewise set by this hyperparameter. In various embodiments, this hyperparameter can be any suitable number (e.g., 8 nodes as shown in FIG. 3, 15 nodes in interaction information extraction layer 300 and represented in the user sequence models, 100 nodes in interaction information extraction layer 300 and represented in the user sequence models, etc.). It will be understood that a larger number of nodes in interaction information extraction layer 300 require more computational resources to perform the analysis discussed herein than a lower hyperparameter, but in various instances the analysis may provide more useful results with additional data.

In various instances, however, the number of interactions with various users may be greater or fewer than this hyperparameter (e.g., 100 interactions). As discussed herein, the value of the hyperparameter may be set as a "minimum interaction threshold value." In various embodiments, one or more users 104 who have had fewer interactions than the minimum interaction threshold value may be excluded from the analysis discussed herein (e.g., no user sequence model is generated for such users and no vectors 212 are generated for such users). In other embodiments, however, users with fewer interactions than the minimum interaction threshold value may be included in the analysis discussed herein by adding in dummy transactions (e.g., if a user has had 95 interactions and the minimum interaction threshold value is 100, then 5 dummy transactions may be added at the end of the sequence). In various embodiments, one or more users 104 who have had more interactions than the minimum interaction threshold value may be included in the analysis discussed herein by generating user sequence models for the first X interactions that were recorded in the one or more data stores of interaction information 200 (e.g., if the minimum interaction threshold value is 100 and user 104 has had 142 interactions, than the 42 most recent interactions may be excluded). Conversely, the last X interactions that were recorded may be used (e.g., if the minimum interaction threshold value is 100 and user 104 has had 142 interactions, then the 42 earliest interactions may be excluded).

Similarly, the minimum interaction threshold value may be used to generate training data to be used to train neural network 130 prior to performing the analysis discussed herein. Thus, for example, for a first user 104 (e.g., user 104A) who has had more individual interactions than the minimum interaction threshold value, a first user sequence model for the training date may be generated based on the first X individual interactions, wherein X is equal to the minimum interaction threshold value; and for a second user 104 (e.g., user 104B) who has had fewer individual interactions than the minimum interaction threshold value, the second user 104 may be excluded that a training user sequence model is not generated for the second user. This training data may then be used to train neural network 130. The various nodes of interaction information extraction layer 300, attention mechanism layer 210, and classification layer 302, after being trained, are assigned weights which influence the attention values generated as a result of analyzing the user sequence models discussed herein.

Attention mechanism layer 210 receives the user sequence models generated by interaction information extraction layer 300 determines the amount of correlation between the individual interactions represented in the user sequence models and the classification represented in classification layer 302 (e.g., whether the particular user 104 has been sorted into Group A or Group B as indicated in the sorting indicators 124). As will be understood, "attention" and "attention mechanism" are terms of art that refer to the quantifying of the amount of interdependence between the input sequence (in this instance, the user sequence models) and the classification of the sequence (in this instance, the label of Group A or Group B). In the embodiment shown in FIG. 3, attention mechanism layer 210 is implemented with five nodes, but any number can be used (e.g., 4 nodes, 6 nodes, etc.). The number of nodes in attention mechanism layer 210 may be set prior to training neural network 130, and if necessary, may be increased or decreased followed by retraining neural network. In the embodiment shown in FIG. 3, classification layer 302 includes two nodes, one representing Group A and one representing Group B. User sequence models for respective users 104 are fed into attention mechanism layer 210 and classification layer 302, and attention values are generated for the individual interactions corresponding to the correlation between the individual interaction and the grouping of the respective user 104 that is indicated by sorting indications 124.

Thus, neural network 130 is usable to generate respective vectors 212 for respective users 104 by analyzing the extracted user interaction information 122 extracted from interaction information 200. In various embodiments, vector 212 has a dimension for each interaction event represented in extracted user interaction information 122 with each dimension having a coefficient calculated using neural network 130. In such embodiments, the coefficient for a given dimension is the attention weight representing the attention of the corresponding interaction event to the sorting of the corresponding user into Group A or Group B.

For example, user 104A and user 104B have been sorted into Group A and user 104C and user 104D have been sorted into Group B, which is indicated by sorting indications 124. In this example, there are six types of interaction event (ET1, ET2, ET3, ET4, ET5, and ET6) and each of users 104A-D has had fifteen interactions with computer system 110. Table 1 below includes the interaction sequences for the four users 104A-D:

TABLE 1

Interaction Sequences for Users 104A-D

| User | Interaction Sequence |
|---|---|
| User 104A | ET1, ET2, ET3, ET4, ET4, ET6, ET1, ET1, ET1, ET3, ET3, ET1, ET5, ET1, ET1 |
| User 104B | ET1, ET1, ET1, ET5, ET1, ET1, ET2, ET3, ET1, ET3, ET1, ET1, ET4, ET3, ET1 |
| User 104C | ET2, ET1, ET1, ET2, ET2, ET3, ET5, ET3, ET1, ET4, ET3, ET1, ET1, ET3, ET3 |
| User 104D | ET3, ET1, ET1, ET1, ET6, ET2, ET1, ET1, ET5, ET4, ET4, ET3, ET3, ET1, ET1 |

As discussed herein, interaction information extraction layer 300 is operable to obtain, from the one or more of data stores of interaction information 200, extracted user interaction information 122 for these sequences of fifteen interactions. Once the neural network 130 obtains the extracted user interaction information 122 for these four interaction sequences, neural network 130 generates attention values for each of the interactions in each sequence. In such embodiments, the attention values are representative of the attention of each interaction to the sorting of the particular user 104 into Group A or Group B. That is, a larger attention value for a particular interaction corresponds to a greater amount of correlation between the particular interaction with a particular user 104 (e.g., user 104A) and the sorting of that user 104 into their group (e.g., user 104A being sorted into Group A). These attention weights in sequence are the individual vectors 212 for the respective interaction sequences. As discussed herein, the sum of the attention weights for a vector is 1.00 in various embodiments. For example, from the extracted user interaction information 122 corresponding to the interaction sequences of Table 1, neural network 130 may generate the following vectors 212 of attention weights:

TABLE 2

Vectors 212 for Users 104A-D

| User | Vector 212 |
|---|---|
| User 104A | [0.07, 0.18, 0.01, 0.01, 0.04, 0.13, 0.09, 0.10, 0.11, 0.01, 0.03, 0.09, 0.03, 0.09, 0.01] |
| User 104B | [0.10, 0.07, 0.08, 0.09, 0.02, 0.02, 0.01, 0.01, 0.08, 0.10, 0.08, 0.10, 0.05, 0.07, 0.12] |
| User 104C | [0.07, 0.21, 0.05, 0.04, 0.07, 0.01, 0.08, 0.02, 0.01, 0.09, 0.10, 0.01, 0.08, 0.01, 0.15] |
| User 104D | [0.06, 0.11, 0.03, 0.07, 0.01, 0.07, 0.05, 0.05, 0.11, 0.06, 0.04, 0.09, 0.07, 0.09, 0.09] |

Referring now to FIG. 4, an example table 400 and a summary table 450 is shown. In FIG. 4, table 400 stores values for example vectors 212 discussed in Table 2 and summary table 450 stores values calculated from the values in table 400. It will be understood that FIG. 4 is merely an example of how values in vectors 212 and information about vectors 212 may be stored in various embodiments, but such values and information may be stored in any suitable manner that maintains a relationship between a given value in a given vector 212 and that given value's position in the interaction sequence and the type of interaction event corresponding to the given value.

As shown in FIG. 4, table 400 includes a plurality of rows 402 corresponding to the respective users 104 (e.g., the first row corresponds to user 104A) and columns 404 corresponding to individual events in the interaction sequences. The rows 402 are split into separate rows 406 and 408 to store, for each particular interaction in the interaction sequences, information about (a) the type of interaction event and (b) the attention value generated for that interaction event, respectively. For example, looking at cells 410 and 412, it will be understood that in the second event in the interaction sequence, user A (e.g., user 104A) had an interaction event of type ET2 and an attention weight of 0.18. Looking at the rest of the attention values for user A in table 400, it will be understood that the second interaction was granted the greatest level of attention of any of the other interactions between user A and computer system 110, which indicates that this interaction event was the most strongly correlated with user A being sorted into Group A. Similarly, for user C, event 15 was granted the greatest level of attention, which indicates that this interaction event was the most strongly correlated with user C being sorted into Group B.

Various methods of statistical analysis may be employed to determine trends or other information from the values in table 400. For example, various statistical analyses may be performed on the individual values in the vectors 212 represented in table 400. As discussed herein, in some embodiments, the mean of individual values for the types of interactions with users 104 who are grouped into Group A may be divided by the mean of individual values for the types of interactions with users 104 who are grouped into Group B. The results of such calculations are shown in summary table 450 in FIG. 4. The ratio of the mean values for Group B divided by Group A are shown in row 452 and the mean values for Group A divided by Group B are shown in row 454. For example, users 104A and 104B are sorted into Group A and users 104C and 104D are sorted into Group B. As illustrated in table 400, there were three interactions of event type ET4 for Group A with a mean attention value of 0.0.333 and three interactions of event type ET4 for Group B with a mean attention value of 0.0633. The ratio of Group A to Group B is 0.6316, which is the value shown in summary table 450. Looking at summary table 450, ET6 has the largest ratio of 13, which may indicate that ET6 is the most meaningful type of interaction in sorting a user into Group A compared to Group B (although, there are only two instances of ET6, so it may also be the case that the small sample size has distorted the results, and in some instances such a result may be disregarded in favor of results that reflect more data). Similarly, ET4 has the greatest ratio of mean value for Group B divided by mean value for Group A, and thus ET4 may be identified as the most meaningful type of interaction in sorting a user into Group B compared to Group A.

In the example shown in FIG. 4, there are six types of interaction event (ET1, ET2, ET3, ET4, ET5, and ET6). It will be understood, however, that any number of types of interaction events may be analyzed. For example, there may be dozens of types of interaction event in various embodiments. In various embodiments, the types of interaction events analyzed herein may include but are not limited to successfully logging in to a user account, unsuccessfully trying to log into a user account, changing log in information, changing account information (e.g., addresses, user names, passwords), logging out of a user account, downloading one or more files, uploading on or more files, installing an app, accessing a website, typing information into a website, making a purchase, interacting with customer service, requesting a refund, receiving a refund, canceling a transaction, reviewing a purchase, etc.

Figure 5:
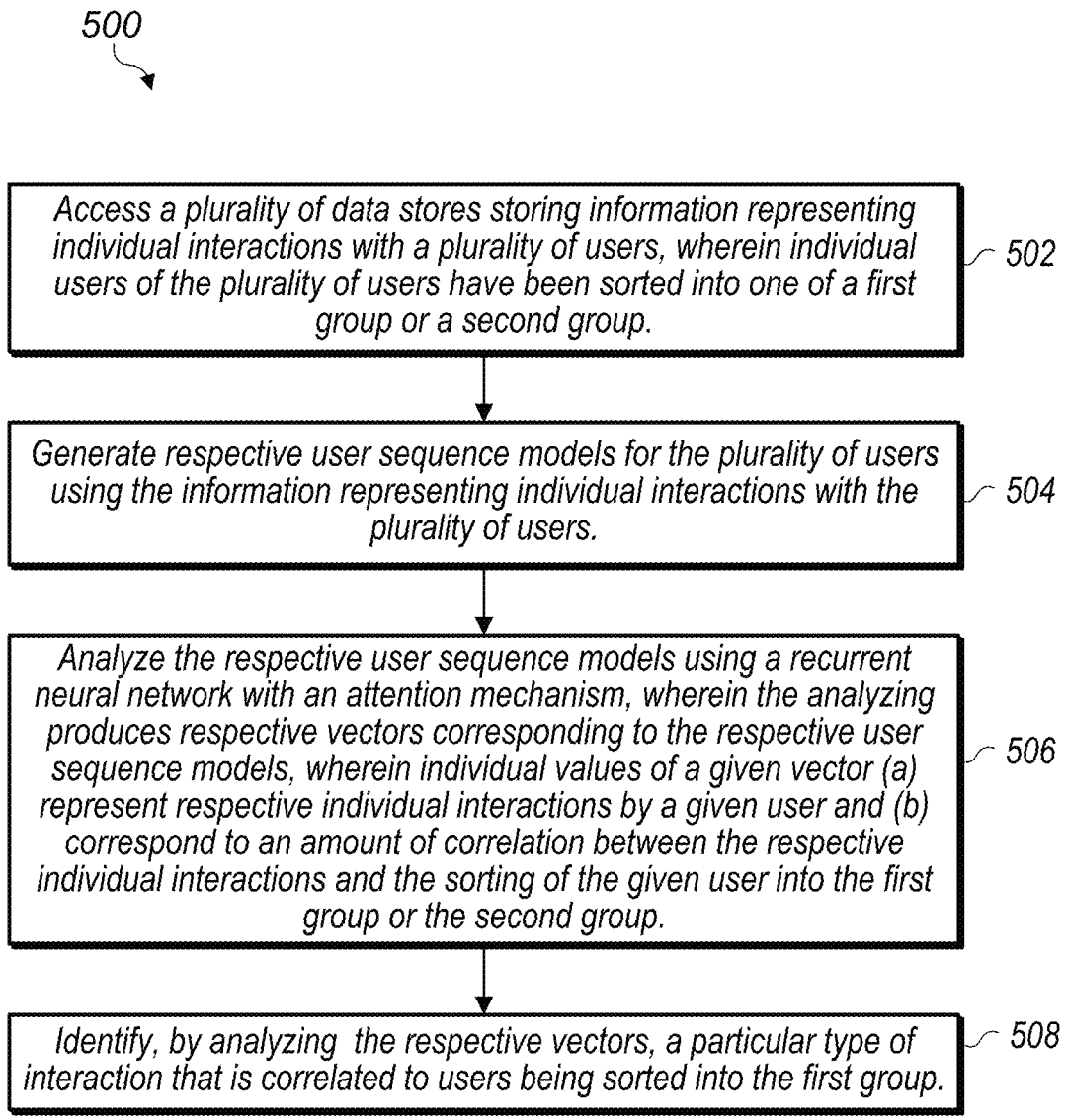
FIG. 5 is a flowchart illustrating an embodiment of a user interaction analysis method in accordance with various embodiments.
Figure 6:
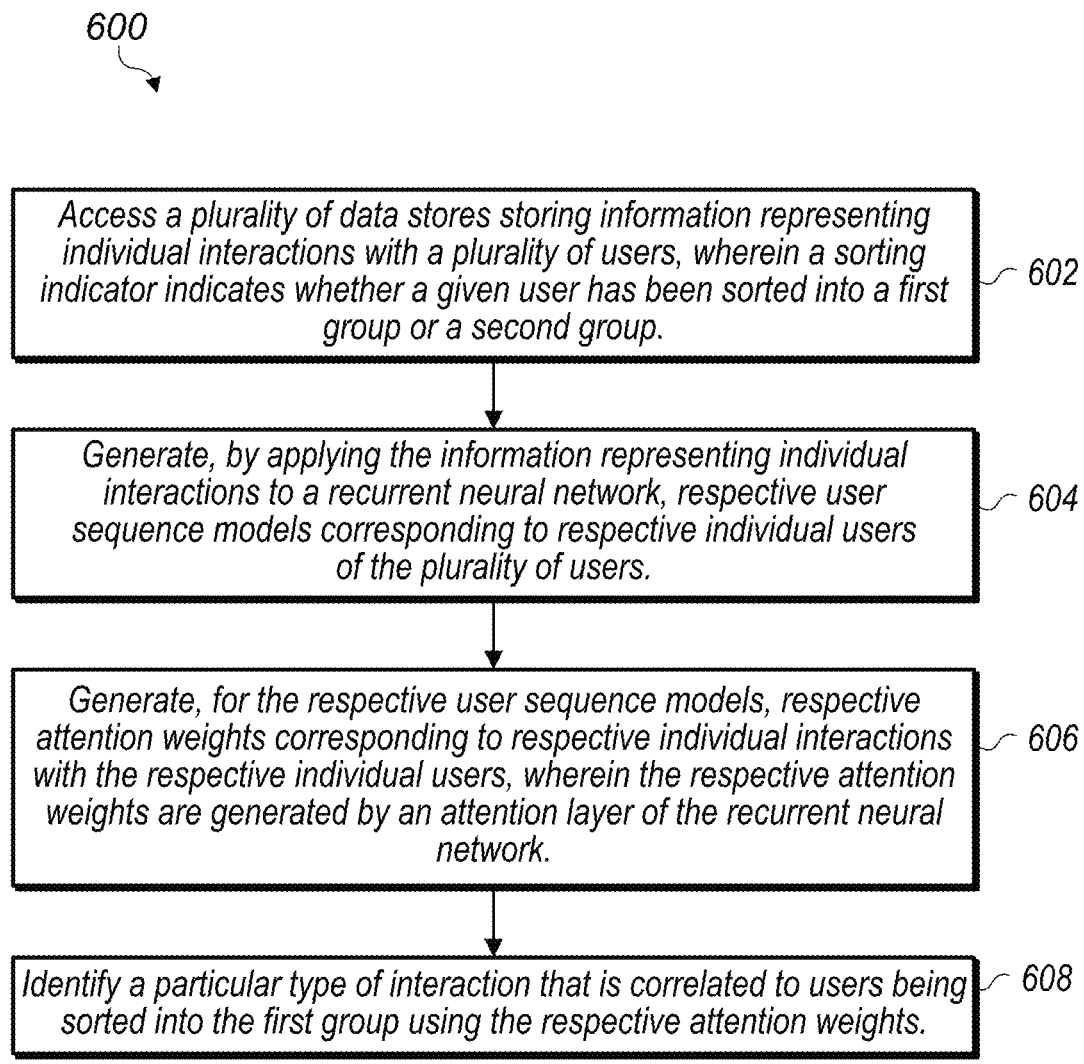
FIG. 6 is a flowchart illustrating an embodiment of a user interaction analysis method in accordance with various embodiments.

FIGS. 5 and 6 illustrate various flowcharts representing various disclosed methods implemented with computer system 110. Referring now to FIG. 5, a flowchart depicting a user interaction analysis method 500 is depicted. In the embodiment shown in FIG. 5, the various actions associated with method 500 are implemented by computer system 110. At block 502, computer system 110 accesses a plurality of data stores of interaction information 200 storing information representing individual interactions with a plurality of users 104. The individual users 104 of the plurality of users 104 have been sorted into one of a first group or a second group (e.g., as indicated by sorting indications 124). At block 504, computer system 110 generates respective user sequence models for the plurality of users 104 using the information representing individual interactions with the plurality of users 104. At block 506, computer system 110 analyzes the respective user sequence models using a recurrent neural network with an attention mechanism (e.g., neural network 130 including interaction information extraction layer 300, an attention mechanism layer 210, and a classification layer 302). The analyzing produces respective vectors 212 corresponding to the respective user sequence models. The individual values of a given vector 212 (a) represent respective individual interactions by a given user 104 and (b) correspond to an amount of correlation between the respective individual interactions and the sorting of the given user 104 into the first group or the second group. At block 508, computer system 110 analyzes the respective vectors 212 to identify a particular type of interaction that is correlated with users 104 being sorted into the first group.

Referring now to FIG. 6, a flowchart depicting a user interaction analysis method 600 is depicted. In the embodiment shown in FIG. 6, the various actions associated with method 600 are implemented by computer system 110. At block 602, computer system 110 accesses a plurality of data stores of interaction information 200 storing information representing individual interactions with a plurality of users 104. One or more sorting indicators 124 indicate whether a given user 104 has been sorted into a first group or a second group. At block 604, computer system 110 generates, by applying the information representing individual interactions to a recurrent neural network (e.g., neural network 130 including interaction information extraction layer 300, an attention mechanism layer 210, and a classification layer 302), respective user sequence models corresponding to respective individual users 104 of the plurality of users 104. At block 606, computer system 110 generates, for the respective user sequence models, respective attention weights corresponding to respective individual interactions with the respective individual users 104. The respective attention weights are generated by an attention layer (e.g., attention mechanism layer 210) of the recurrent neural network (e.g., neural network 130). At block 608, computer system 110 identifies a particular type of interaction that is correlated with users 104 being sorted into the first group using the respective attention weights.

Exemplary Computer System

Figure 7:
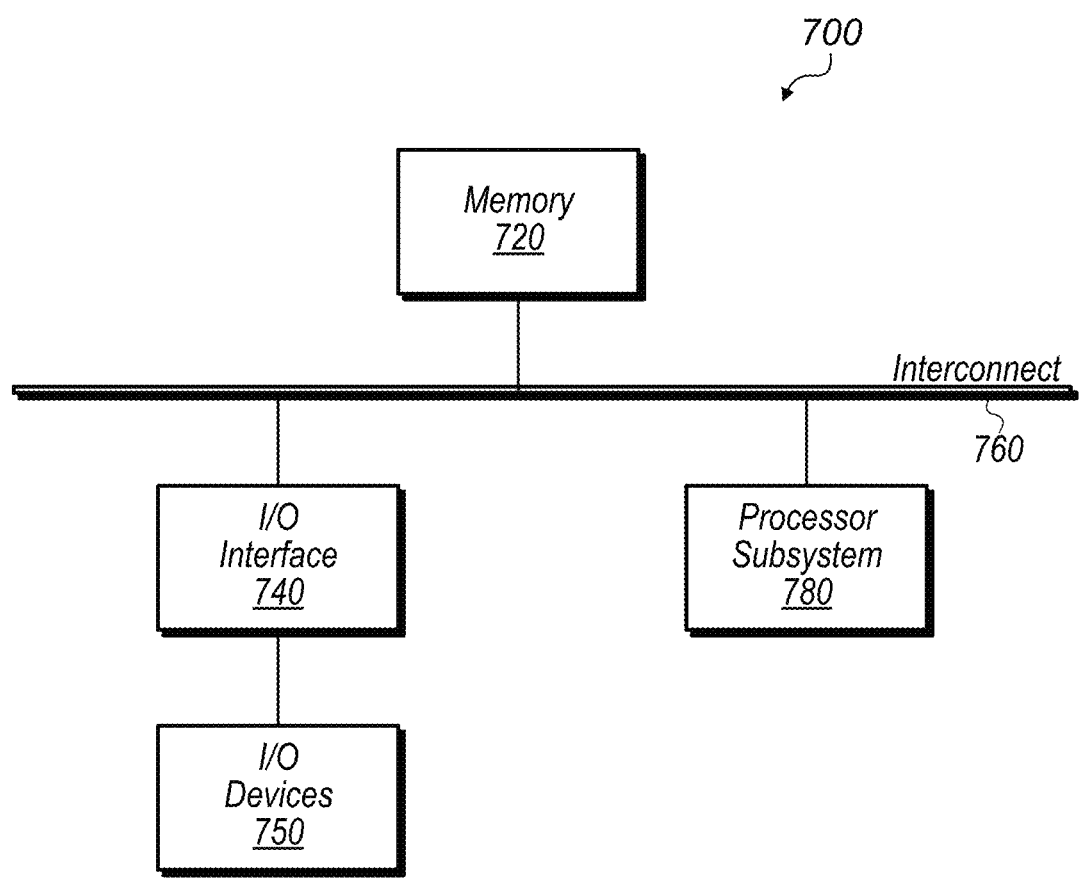
FIG. 7 is a block diagram of an exemplary computer system, which may implement the various components of FIGS. 1 and 2.

Turning now to FIG. 7, a block diagram of an exemplary computer system 700, which may implement the various components of network 100 (e.g., computer system 110, remote computer systems 102) is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable to store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device (e.g., configured to communicate over WiFi, Bluetooth, Ethernet, etc.), another example of an I/O device 750.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
    accessing, with a computer system, a plurality of data stores storing information representing individual interactions with a plurality of users, wherein individual users of the plurality of users have been sorted into one of a first group or a second group;
    generating, by the computer system, respective user sequence models for the plurality of users using the information representing individual interactions with the plurality of users;
    analyzing, by the computer system, the respective user sequence models using a recurrent neural network with an attention mechanism implemented as one or more attention layers, wherein the analyzing produces respective vectors corresponding to the respective user sequence models, wherein the respective vectors include respective sequences of attention weights, wherein a given sequence of attention weights for a given vector (a) represents respective individual interactions by a given user and (b) corresponds to an amount of correlation between the respective individual interactions and the sorting of the given user into the first group or the second group; and
    identifying, by the computer system analyzing the respective vectors, a particular type of interaction that is correlated to users being sorted into the first group.

2. The method of claim 1,
    wherein analyzing the respective vectors includes comparing attention weights for a given type of interaction for users sorted into the first group with attention weights for the given type of interaction for users sorted into the second group; and
    wherein the particular type of interaction is identified based on the comparing.

3. The method of claim 1,
    wherein analyzing the respective vectors includes performing a statistical analysis of the attention weights of the respective vectors corresponding to users grouped in the first group, and
    wherein the particular type of interaction is identified based on the statistical analysis.

4. The method of claim 3, wherein the statistical analysis includes:
    dividing a mean of the attention weights corresponding to the particular type of interaction with users grouped in the first group by a mean of the attention weights corresponding to the particular type of interaction with users grouped in the second group; and
    identifying the particular type of interaction based on a quotient for the particular type of interaction having the maximum or minimum value from among quotients corresponding to other types of interaction.

5. The method of claim 3, wherein the statistical analysis includes correlating the attention weights for the particular type of interaction with positions of representations of individual interactions of the particular type of interaction in the respective user sequence models.

6. The method of claim 1,
    wherein a sum of the attention weights of the given vector equals the sums of the attention weights of the other respective vectors; and
    wherein the attention weights range between 0 and 1.

7. The method of claim 1, further comprising:
    determining a hyperparameter for the recurrent neural network, wherein the number of individual interactions to represent in the respective user sequence models is based on the hyperparameter;
    wherein the number of attention weights in the respective vectors is based on the hyperparameter.

8. The method of claim 7, further comprising:
    generating, by a computer system, training user sequence models using a second plurality of users, wherein the second plurality of users are sorted into one of the first group or the second group, wherein the generating includes:
        for a first user who has had more individual interactions than the hyperparameter, generating a first user sequence model based on the first X individual interactions, wherein X is equal to the hyperparameter, and
        for a second user who has had fewer individual interactions than the hyperparameter, excluding the second user from the second plurality of users such that a training user sequence model is not generated for the second user; and
    training the recurrent neural network using the training user sequence models.

9. The method of claim 1, further comprising:
accessing, with the computer system, a plurality of data stores storing information corresponding to the plurality of users;
wherein generating the respective user sequence models includes using information accessed from the plurality of data stores such that the respective user sequence models for one or more of the plurality of users are generated using information accessed from separate data stores.

10. A non-transitory, computer-readable medium storing instructions that when executed by a computer system cause the computer system to perform operations comprising:
accessing, with a computer system, a plurality of data stores storing information representing individual interactions with a plurality of users, wherein individual users of the plurality of users have been sorted into one of a first group or a second group;
generating respective user sequence models for a plurality of users, wherein entries in the respective user sequence models represent individual interactions by respective users;
analyzing the respective user sequence models using a recurrent neural network with an attention mechanism implemented as one or more attention layers, wherein the analyzing produces respective vectors corresponding to the respective user sequence models, wherein the respective vectors include respective sequences of attention weights calculated by the recurrent neural network that represent respective individual interactions by the respective users, wherein the attention weights correspond to an amount of correlation between the respective individual interactions and the sorting of the given user into the first group or the second group; and
identifying, based on analyzing the respective vectors, a first particular type of interaction that is correlated to users belonging to the first group and a second particular type of interaction that is correlated to users belonging to the second group.

11. The computer-readable medium of claim 10,
wherein the first particular type of interaction contributed the most to users being sorted into the first group; and
wherein the second particular type of interaction contributed the most to users being sorted into the second group.

12. The computer-readable medium of claim 10,
wherein analyzing the respective vectors includes comparing:
values calculated using respective sequences of attention weights for respective vectors of users sorted in the first group, and
values calculated using respective sequences of attention weights for respective vectors of users sorted in the second group.

13. The computer-readable medium of claim 10, wherein the first group corresponds to users who have reported fraudulent account activity and the second group corresponds to users who have not reported fraudulent account activity.

14. The computer-readable medium of claim 13, wherein the operations further comprise:
based on identifying the first particular type of interaction, adjusting one or more security parameters for the computer system corresponding to the first particular type of interaction.

15. The computer-readable medium of claim 10, wherein the recurrent neural network is implemented by a long short-term memory and the attention mechanism is implemented using one or more attention layers of the long short-term memory.

16. A method comprising:
accessing, with a computer system, a plurality of data stores storing information representing individual interactions with a plurality of users, wherein a sorting indicator indicates whether a given user has been sorted into a first group or a second group;
generating, by the computer system applying the information representing individual interactions to a recurrent neural network, respective user sequence models corresponding to respective individual users of the plurality of users;
generating, by the computer system for the respective user sequence models, respective attention weights corresponding to respective individual interactions with the respective individual users, wherein the respective attention weights are generated by an attention layer of the recurrent neural network, and wherein the respective attention weights correspond to an amount of correlation between the respective individual interactions and the sorting of the given user into the first group or the second group; and
identifying, by the computer system, a particular type of interaction that is correlated to users being sorted into the first group using the respective attention weights.

17. The method of claim 16, wherein the respective attention weights corresponding to the individual respective users are stored in respective vectors, wherein the respective attention weights range between 0 and 1, and the sum of the attention weights in a given vector is 1.

18. The method of claim 16, wherein identifying the particular type of interaction includes:
calculating a ratio for the particular type of interaction by dividing a mean of attention weights corresponding to the particular type of interaction with users grouped in the first group by a mean of attention weights corresponding to the particular type of interaction with users grouped in the second group; and
identifying the particular type of interaction based on the ratio.

19. The method of claim 16,
wherein a given user sequence model for a given user of the plurality of users represents a plurality of individual interactions with the given user in a chronological sequence, wherein the user sequence model for the given user records, for each of the plurality of individual interactions with the given user, (a) an interaction type and (b) an order in the chronological sequence; and
wherein the respective attention weights generated for given user sequence model correspond to respective interaction types and respective orders in the chronological sequence.

20. The method of claim 16, further comprising:
identifying a second type of interaction that is correlated to users being sorted into the second group using the respective attention weights.

* * * * *